UNITED STATES PATENT OFFICE.

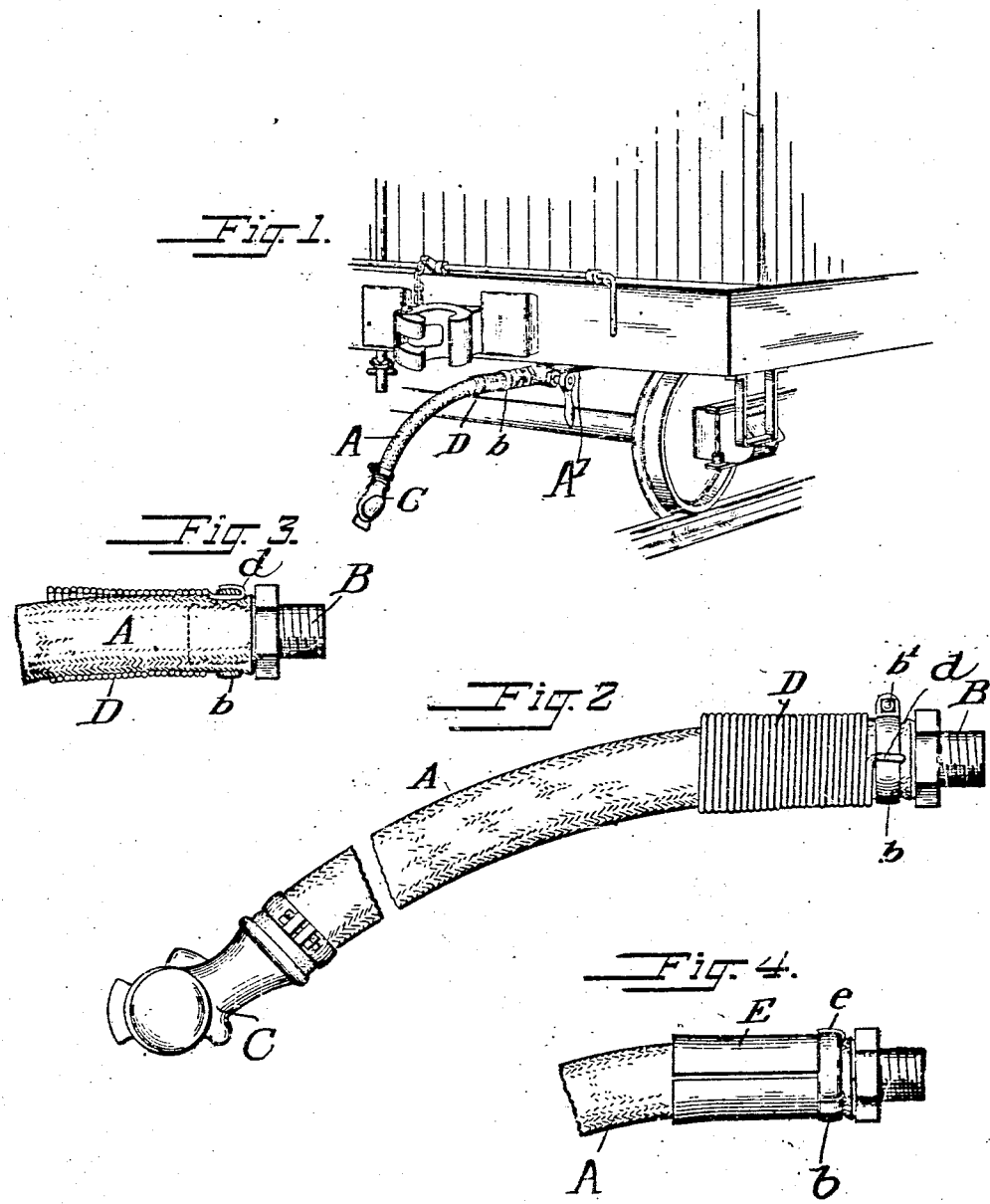

GUILFORD S. WOOD, OF CHICAGO, ILLINOIS.

SUPPORTING-SHEATH FOR TRAIN-PIPE COUPLING-HOSE.

No. 880,060.	Specification of Letters Patent.	Patented Feb. 25, 1908.

Application filed May 20, 1907. Serial No. 374,795.

*To all whom it may concern:*

Be it known that I, GUILFORD S. WOOD, a citizen of the United States, and a resident of Chicago, in the county of Cook and State of Illinois, have invented certain new and useful Improvements in Supporting-Sheaths for Train-Pipe Coupling-Hose; and I do hereby declare that the following is a full, clear, and exact description thereof, reference being had to the accompanying drawings, and to the letters of reference marked thereon, which form a part of this specification.

This invention relates to a novel form of construction for supporting the extended ends of flexible train pipes or hose of air brake or steam heating systems of railway cars, and the invention consists in the matters hereinafter more particularly set forth and pointed out in the appended claims.

Among the objects of the invention is to provide means for supporting the flexible hose of air brake or steam heating systems which connects the parts of said systems of two adjacent cars in such manner as to avoid tendency of the hose breaking when projecting from the end of a car and uncoupled from the companion hose or pipe of another car.

As shown in the accompanying drawings— Figure 1 is a view in perspective showing the end of a railway car provided with an air brake or other hose that is supported from the stationary pipe of the car by a device which embodies the novel features of my invention. Fig. 2 is an enlarged view, showing in elevation the said air brake hose and my improved supporting or protecting device. Fig. 3 is a detail elevation of one end of said hose supporting or protecting device showing parts broken away. Fig. 4 is a view showing in elevation a modified form of the device.

As shown in Figs. 1 to 3, inclusive, A indicates the flexible connecting hose which connects the train pipes of adjacent cars and is attached at one end to the end of an air pipe $A^1$ at the end of the car and is provided at its free end with a familiar form of coupling C by which the hose is adapted to be attached to a similar connecting hose of another car. The said hose is provided at one end with a tubular connecting member or nipple B which is provided with screw-threads by which it is adapted to be connected to one end of the train pipe located beneath the car. Said nipple B is inserted for part of its length in the end of the hose and is secured therein by means of a clamping ring $b$ (Figs. 2 and 3) which encircles the hose and is tightened thereupon by means of a bolt and nut $b^1$. These parts are constructed and arranged in a manner substantially the same as heretofore. It has been found in such prior construction that the hose, when supported by said nipple B alone and hanging down at its other end, is bent sharply at a point near its attachment to said nipple and soon becomes broken at such place. It has also been found that the hose is frequently injured by trainmen carelessly handling their tools, and especially by the careless use of a coupling pin or other heavy tool which is sometimes used to open or close the air-cock shown at the end of the air pipe $A^1$ when said air-cock resists being turned by hand. The present invention contemplates a remedy for these difficulties and it consists in incasing the end of the hose adjacent to the connecting member B by a supporting sheath of relatively stiffer material such, for instance, as a helical coil of wire D wound about the attached end of the hose with its turns closely adjacent to each other. Said coil of wire at its end nearest the nipple B closely embraces the hose, and the free end of the wire is attached to the band $b$ by being inserted under such band and bent around same in the form of a hook $d$. As indicated in Fig. 3, which shows in dotted lines the position of the part of the nipple B which is inserted in the hose, the smaller end of the coil D overlaps the nipple B, whereby the hose is supported in a manner to prevent it from bending around the end of said nipple B and being thereby broken or ruptured. At its opposite end said coil is made of a diameter somewhat greater than the diameter of the hose, thereby allowing the hose, when uncoupled from an adjacent hose and supported only by the nipple B and said coil D, to assume a gradual curve over the free edge of said coil. The turns of wire constituting said latter end of the coil are prevented from unwinding by being soldered together.

In Fig. 4 is shown a modified form of construction in which the coil D is replaced by a sheath consisting of a sheet metal tube E surrounding the end of the hose and attached at one end to the band $b$ by means of integral lugs or hooks $e$ which are inserted under said band and bent around the same. Said sheath E at its end nearest the nipple B is of a diameter such that it closely encircles the hose, and at its opposite end said sheath is of a somewhat larger diameter. It is arranged in a manner similar to the arrangement of the sheath shown in Figs. 1 to 3, inclusive, in overlapping relation with respect to the end of the nipple B; and the hose A, when supported only by said sheath and the said nipple is free to assume a gradual curve over the free edge of said sheath in a manner to prevent it from being cracked or broken by being bent sharply at any one point. In order to impart a desired flexibility to the sheath it is shown as longitudinally split.

I claim as my invention:—

1. A resilient supporting member for train pipe coupling hose comprising a sheath of relatively stiff material surrounding one end of the hose and overlapping the train pipe nipple, said sheath closely embracing the hose adjacent to the nipple and being made larger in diameter at its other end.

2. A resilient connecting member for train pipe coupling hose comprising, in combination with a train pipe and its nipple adapted for insertion at one end into the hose, a sheath surrounding said hose and arranged in overlapping relation with respect to said nipple, the sheath increasing in diameter and flexibility towards its outer end.

3. The combination with a train pipe hose and a tubular connecting nipple inserted in the end of the same, of a sheath surrounding the end of said hose and arranged in overlapping relation with respect to said nipple, said sheath consisting of a helical coil of wire closely surrounding at its inner end said hose and increasing in diameter towards its outer end.

In testimony that I claim the foregoing as my invention I affix my signature in the presence of two witnesses, this 16th day of May, A. D. 1907.

GUILFORD S. WOOD.

Witnesses:
GEORGE R. WILKINS,
T. H. ALFREDS.